Patented July 20, 1954

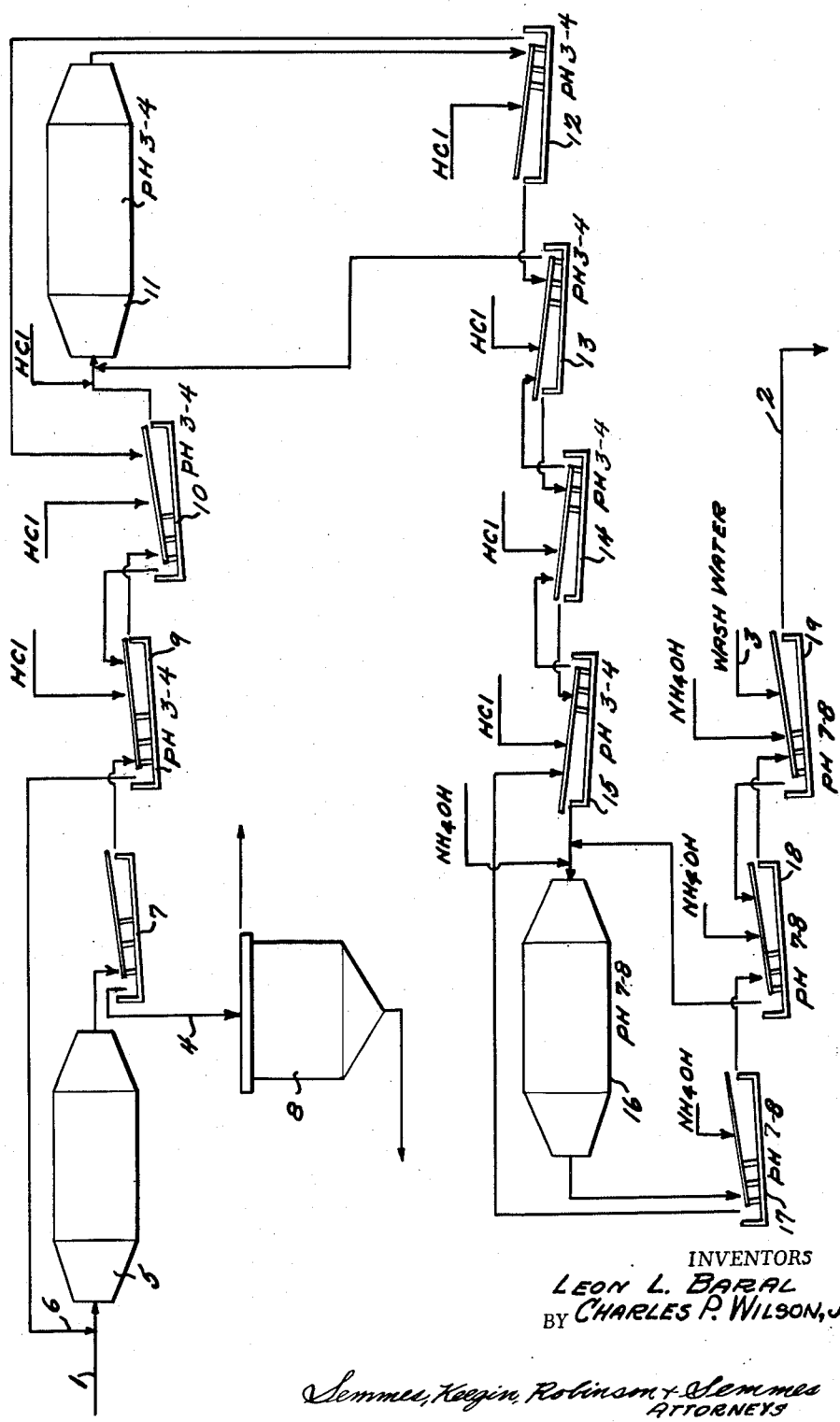

2,684,340

UNITED STATES PATENT OFFICE 2,684,340

SULFATE REMOVAL FROM SILICA-ALUMINA CATALYST

Leon L. Baral, Baltimore, Md., and Charles P. Wilson, Jr., Cincinnati, Ohio, assignors to The Davison Chemical Corporation, Baltimore, Md.

Application April 29, 1949, Serial No. 90,462

9 Claims. (Cl. 252—455)

This invention relates to a method of preparing catalysts and more particularly to the removal of sulfate ions in the preparation of silica-alumina catalyst.

Often it is desirable to incorporate alumina in silica gels in the preparation of catalytic materials because of its high catalytic activity for certain purposes. The alumina is added in a number of different methods, many of which involve the use of aluminum sulfate. For example, a solution of sodium silicate may be neutralized with a solution of aluminum sulfate and any aluminum ions present in the resultant gel subsequently precipitated as alumina. Another commonly used method is to impregnate a silica gel with a solution of aluminum sulfate and subsequently neutralize the impregnated gel to precipitate alumina.

When silica-alumina gels are prepared by the methods described above, soluble salts, particularly sodium sulfate, are deposited in the gel. These salts are generally detrimental to the physical and catalytic properties of the gel and must be removed to form an efficient catalyst. The presence of the sulfate ion in the catalyst is especially undesirable because of its effect in impairing the catalytic activity of the gel when present in concentrations above about 1%, calculated as $SO_4$, on a dry basis. Removal of the sulfate ion is particularly difficult in gels containing high alumina concentrations. The ordinary methods of washing heretofore available will reduce the sulfate concentration in a silica-alumina gel containing 20–24% alumina only to about 2¼–2½%.

It is an object of this invention to provide a method for removing the sulfate ion from silica-alumina catalyst.

Another object of this invention is to provide a washing procedure for the removal of the sulfate radical from silica-alumina catalyst containing high alumina concentrations.

It is also an object of this invention to provide a method for reducing the sulfate ion concentration of silica-alumina catalyst to below 1%.

With these and other objects in view, which will become apparent in the following description, this invention resides in washing a silica-alumina gel with a weakly acid solution to remove zeolitic soda and a separate wash with a weakly alkaline solution, to reduce the concentration of the sulfate radical in the gel to below 1%.

The single figure of the drawings illustrates typical apparatus for the washing of a silica-alumina catalyst according to this invention.

The silica-alumina gel treated according to this invention may be prepared by various processes. For example, the unwashed gel may be in the form of a slurry prepared in accordance with the method described in the copending application of Tongue and Baral, Serial No. 70,362, filed January 11, 1949, and entitled Silica-Alumina Catalyst, now abandoned, in which a dilute solution of sodium silicate is mixed with a dilute solution of sulphuric acid and agitated during the setting of the reaction product to form a silica hydrogel in the form of a finely divided slurry. Preferably, the slurry has a pH of about 2.6. The acidified slurry is partially neutralized with ammonia to a pH of about 6½ and then mixed with a solution of aluminum sulfate after which the slurry of gel is neutralized to a pH of 7 with ammonia solution to precipitate alumina in the gel. The novel washing process herein described may be substituted for the method of washing the gel after the spray-drying described in that application. Generally, the advantages of the present invention may be obtained in the treatment of any silica-alumina gel and particularly when the alumina content of the gel is in the range from about 20–24%.

A specific washing arrangement employing this invention is illustrated in the drawings. While effective removal of soluble salts in the sulfate radical is obtained with the specific arrangement shown it will be appreciated that the advantages of this invention may be realized with other apparatus and variations in the flow of the materials through the washing stage. In the preferred apparatus for washing the gel to form an efficient catalyst the flow of gel is generally counter-current to the flow of the wash water. Referring to the drawings, the gel is introduced into the washing apparatus through line 1 and discharged from the washing apparatus through line 2. The wash water on the other hand, is introduced into the washing apparatus through line 3, near line 2, and discharged at the gel inlet end of the apparatus through a line 4.

The silica-alumina gel is introduced through line 1 into a rotating washing drum 5 where it is thoroughly agitated with wash water, introduced into the drum 5 through line 6, from one of the classifiers. A slurry of silica-alumina gel and wash water is discharged from rotating drum 5 into a rake classifier 7. The overflow from classifier 7, containing the gel fines, passes through line 4 into a thickener 8 in which the fines are separated from the wash water. Ordinarily the fines are recycled through the gel manufacturing process and the overflow from the thickener 8 is discharged to the sewer.

The larger gel particles in classifier 7 settle to the bottom and are moved by the rakes to the upper end of the classifier and are then discharged to the next classifier 9. The operation of classifier 9 is similar to that of classifier 7, with the exception that the overflow of wash water and entrained fines is carried by line 6 to the inlet of the washing drum 5. The gel discharged from classifier 9 passes to the next classifier 10 in series and the overflow from classifier 10 passes counter-currently with the gel into classifier 9.

The gel discharged from the classifier 10 is delivered to a second washing drum 11 and the product from that drum is discharged into a classifier 12. A series of four classifiers, designated by reference numerals 12, 13, 14 and 15 follow the washing drum 11 and are connected in a manner similar to the classifier following wash drum 5. The overflow from classifier 13 by-passes classifier 12 and passes directly to the inlet of the washing drum 11 and the overflow from the classifier 12 by-passes the washing drum 11 and moves directly to the classifier 10.

A third washing drum 16 receives the silica-alumina gel discharged from classifier 15 and discharges it to a classifier 17. The gel is thoroughly agitated in washing drum 16 with the liquid overflow from a classifier 18 following classifier 17. A third classifier 19 is in series with classifiers 17 and 18 following the washing drum 16. Fresh water is added to classifier 19 and passes counter-currently therein to the gel to classifier 18. The overflow from classifier 17 by-passes the washing drum 16 and flows directly to classifier 15 similar to the overflow from classifiers 13 and 9. It will be appreciated from a study of the flow sheet illustrated in the drawings, that the flow of the silica-alumina gel is from washing drum 5 to classifier 19 and the flow of the wash water is generally counter-current thereto and passes from classifier 19 to drum 5.

Removal of the soluble salts from the gel according to this invention is accomplished by washing the gel separately with a slightly acidic solution and a slightly alkaline wash water. The acidic wash removes zeolitic soda retained by the silica-alumina gel and the alkaline wash reduces the sulfate radical concentration to below 1%.

Again referring to the drawings, hydrochloric acid is added to rake classifiers 9, 10, 12, 13, 14 and 15 and drum 11 in sufficient quantities to maintain a pH of about 3-4 in those vessels for the acid wash. Ordinarily, little can be gained by adding acid to classifier 7 and washing drum 5 because of the very high salt concentrations in the wash water in these vessels. A dilute aluminum sulfate solution or a dilute ammonium sulfate solution may be used in the acidic wash for removal of zeolitic soda in place of the hydrochloric acid.

Removal of the sulfate radical from silica-alumina gel is accomplished by the addition of sufficient aqueous ammonia in classifiers 17, 18, and 19 and washing drum 16 to maintain the pH of the effluent wash water from those vessels at about 7-8. The aqueous ammonia solution can be added most conveniently in the form of a 10-20% solution of ammonia. Actually, other alkaline materials, for example, amines, can be employed in the washing, but, in most instances, ammonia will be preferred because of its low cost. Since a catalyst free of sodium and other alkali metal salts is desired, a dilute solution of sodium hydroxide would not be suitable.

The washing procedure outlined above has been found to be extremely effective in the removal of the sulfate radical from silica-alumina gels. While effective on all gels of this type, it is of most value in the washing of silica-alumina gels having an alumina content in the range of 20-24%. Removal of the sulfate radical from low alumina gels is not difficult, but the commercially feasible methods of washing which were hitherto available would reduce the sulfate content of high-alumina catalysts only to about 2%. When the high-alumina gels were washed according to this invention, the sulfate concentration is reduced to below 1%.

The washing method of this invention has been described with reference to specific washing apparatus permitting continual counter-current washing of the silica-alumina gel, but is not limited thereto.

Under some circumstances, it might be desirable to retain the gel in a single washing vessel and pass wash water over the gel which remains in place. Control of the washing operation is obtained by addition of the acid and ammonia to the wash water at suitable intervals to maintain the desired pH for removal of the soda and sulfate ions.

While this invention has been described in detail with respect to a particular modification of the invention, it is to be understood that the concept of this invention is not limited to those details, but is determined by the scope of the appended claims.

We claim:

1. A method of washing silica-alumina gel in the preparation of a catalyst comprising washing the gel with an acidic solution resulting in an effluent from the gel having a pH of about 3-4, and then washing the gel with an alkali metal-free alkaline aqueous solution so as to maintain a pH in the effluent of about 7-8 to remove the sulfate radical from the gel.

2. A method of manufacturing a silica-alumina catalyst of about 20-24% alumina having a low sulfate content comprising precipitating a silica gel from an alkaline silicate, impregnating the precipitated gel with aluminum sulfate to an aluminum concentration sufficient to give a gel having an alumina concentration of 20-24%, neutralizing the impregnated gel to precipitate the aluminum as alumina, drying the gel, washing the gel to remove the soluble salts, said washing including a wash with a weakly acidic wash water and a separate wash with a weak aqueous solution of ammonia, and drying the gel.

3. In the manufacture of a silica-alumina catalyst containing about 20-24% alumina and substantially free of the sulfate radical from silica-alumina gel, the steps of washing the gel with a weakly acidic solution resulting in an effluent of a pH of approximately 3-4, and then washing the gel with an aqueous ammonia solution so as to maintain a pH in this effluent of about 7-8 to remove the sulfate radical from the gel.

4. In the manufacture of a silica-alumina catalyst containing about 20-24% alumina from silica-alumina gel, the steps of washing the gel with a weak hydrochloric acid solution resulting in an effluent of a pH of approximately 3-4, and then washing the gel with an aqueous ammonia solution so as to maintain a pH in this effluent of about 7-8 to remove the sulfate radical from the gel.

5. In the manufacture of a silica-alumina catalyst having a 20-24% alumina from silica-alumina gel, the steps of washing the gel with a dilute solution of aluminum sulfate to eliminate the alkali metal ions from the gel, and then washing the gel with a weakly alkaline aqueous ammonia solution resulting in an effluent of a pH of about 7-8 to remove the sulfate radical from the gel.

6. In the manufacture of a silica-alumina catalyst having 20-24% alumina from silica-alumina gel, the steps of washing the gel with a dilute solution of ammonium sulfate for removal of the alkali metal ions from the gel, and then washing the gel with a weakly alkaline aqueous ammonia solution resulting in an effluent of a pH of about 7-8 to remove the sulfate radical from the gel.

7. In the manufacture of a low sulfate content silica-alumina catalyst, the steps of washing a silica-alumina gel with a dilute solution of hydrochloric acid for removal of the alkali metal ions from the gel, and in a separate wash passing an aqueous ammonia solution having a pH of about 7-8 as it leaves the gel in contact with the gel for removal of the sulfate radical therefrom.

8. In the manufacture of a low sulfate content silica-alumina catalyst containing about 20-24% alumina, the steps of washing the silica-alumina gel with a dilute solution selected from the group consisting of hydrochloric acid, aluminum sulfate and ammonium sulfate, and then washing the gel with a weak aqueous solution of an alkaline material selected from the group consisting of amines and ammonia to remove the sulfate radical from the gel.

9. In the manufacture of a silica-alumina catalyst of low sulfate content, the improvement which comprises washing a silica-alumina gel containing sulfate ions with a weakly acid wash water to remove water-soluble salts therefrom, and then washing the gel with a weakly alkaline aqueous ammonia solution for a time sufficient to remove substantially all of the sulfate radical from the gel.

References Cited in the file of this patent

UNITED STATES PATENTS

| Number | Name | Date |
|---|---|---|
| 2,271,319 | Thomas et al. | Jan. 27, 1942 |
| 2,315,024 | Sturgeon | Mar. 30, 1943 |
| 2,356,303 | Connolly | Aug. 22, 1944 |
| 2,405,408 | Connolly | Aug. 6, 1944 |
| 2,480,628 | Bodkin | Aug. 30, 1949 |
| 2,481,825 | Connolly | Sept. 13, 1949 |